US012289737B2

(12) United States Patent
Vadapalli et al.

(10) Patent No.: US 12,289,737 B2
(45) Date of Patent: Apr. 29, 2025

(54) CONTROL MECHANISMS FOR BANDWIDTH PART SWITCHING FOR MULTIPLE SUBSCRIBERS

(71) Applicant: QUALCOMM Incorporated, San Diego, CA (US)

(72) Inventors: Syam Pavan Vadapalli, Visakhapatnam (IN); Harinath Reddy Patel, Hyderabad (IN); Ashutosh Gupta, Gangapur (IN); Ankammarao Ravuvari, Hyderabad (IN); Roop Sagar Inakollu, Nellore (IN)

(73) Assignee: QUALCOMM Incorporated, San Diego, CA (US)

( * ) Notice: Subject to any disclaimer, the term of this patent is extended or adjusted under 35 U.S.C. 154(b) by 491 days.

(21) Appl. No.: 17/716,455

(22) Filed: Apr. 8, 2022

(65) Prior Publication Data

US 2023/0328742 A1    Oct. 12, 2023

(51) Int. Cl.
*H04W 72/23* (2023.01)
*H04W 72/0446* (2023.01)
*H04W 88/06* (2009.01)

(52) U.S. Cl.
CPC ....... *H04W 72/23* (2023.01); *H04W 72/0446* (2013.01); *H04W 88/06* (2013.01)

(58) Field of Classification Search
None
See application file for complete search history.

(56) References Cited

U.S. PATENT DOCUMENTS

| | | | | |
|---|---|---|---|---|
| 2010/0322079 | A1* | 12/2010 | Kitazoe | H04W 36/0088 370/332 |
| 2013/0315119 | A1* | 11/2013 | Tabet | H04W 52/0216 370/329 |
| 2014/0004849 | A1* | 1/2014 | Su | H04W 74/0833 455/423 |
| 2015/0350934 | A1* | 12/2015 | Yang | H04W 56/0005 370/252 |
| 2015/0372788 | A1* | 12/2015 | Xiao | H04L 1/1887 714/748 |
| 2015/0373671 | A1* | 12/2015 | Yang | H04W 60/005 455/450 |
| 2016/0037578 | A1* | 2/2016 | Shah | H04W 76/28 370/311 |

(Continued)

*Primary Examiner* — Hassan A Phillips
*Assistant Examiner* — Gautam Sharma
(74) *Attorney, Agent, or Firm* — Holland & Hart LLP

(57) ABSTRACT

Methods, systems, and devices for wireless communications are described. In some aspects, a user equipment (UE) may be configured with multiple bandwidth parts (BWPs) and may support multiple subscriber identification modules (SIMs) (e.g., may operate in a multi-SIM (MSIM) mode). The UE may tune away from a default data SIM (DDS) subscription for a tune away gap and may miss any downlink signaling, such as an indication of a BWP switch, for a duration of the tune away. To avoid latency resulting from such missed downlink signaling, the UE may support a mechanism according to which the UE may autonomously switch to a different BWP despite a missed command from a network entity. Such a mechanism may include transmission of a scheduling request (SR) on each of multiple BWPs configured for the UE and monitoring each of the multiple BWPs for signaling responsive to the SR.

28 Claims, 8 Drawing Sheets

(56) References Cited

U.S. PATENT DOCUMENTS

| | | | |
|---|---|---|---|
| 2016/0227547 A1* | 8/2016 | Su | H04W 76/28 |
| 2016/0345351 A1* | 11/2016 | Bhattacharjee | H04W 48/18 |
| 2017/0208611 A1* | 7/2017 | Chincholi | H04W 72/1215 |
| 2017/0302419 A1* | 10/2017 | Liu | H04L 5/0078 |
| 2018/0007602 A1* | 1/2018 | Jamadagni | H04W 36/00698 |
| 2018/0288732 A1* | 10/2018 | Balasubramaniam | H04W 76/19 |
| 2018/0368172 A1* | 12/2018 | Li | H04W 72/23 |
| 2020/0170063 A1* | 5/2020 | Hu | H04W 72/0453 |
| 2020/0245360 A1* | 7/2020 | Xu | H04W 72/21 |
| 2020/0337069 A1* | 10/2020 | Jiang | H04L 27/0006 |
| 2021/0014667 A1* | 1/2021 | Lovlekar | H04W 88/06 |
| 2022/0360395 A1* | 11/2022 | Kim | H04L 5/0005 |
| 2022/0394605 A1* | 12/2022 | Wang | H04W 48/18 |

* cited by examiner

CONTROL MECHANISMS FOR BANDWIDTH PART SWITCHING FOR MULTIPLE SUBSCRIBERS

FIELD OF TECHNOLOGY

The following relates to wireless communications, including control mechanisms for bandwidth part (BWP) switching for multiple subscribers.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support control mechanisms for bandwidth part (BWP) switching for multiple subscribers. For example, the described techniques enable a user equipment (UE) that supports multiple subscriber identification modules (SIMS) to determine a BWP to use for communication with a network device after a tune away gap during which the UE tunes away from a first subscription (e.g., a default data SIM (DDS) subscription) to a second subscription (e.g., a non-DDS (nDDS) subscription). For example, the UE may tune away from a first subscription to a second subscription and operate using the second subscription for a given time interval (e.g., a tune away gap). During the tune away gap, the network entity may transmit downlink signaling, such as downlink control information (DCI), to the UE which indicates a switch from a first BWP (e.g., a currently active BWP) to a second BWP for the first subscription. As the UE is operating using the second subscription during the tune away gap, the UE may be unable to receive the DCI. After the tune away gap, the UE may tune from the second subscription to the first subscription and transmit a scheduling request (SR) to the network entity on one or more BWPs (e.g., including the second BWP) other than the first BWP. The UE may monitor each of the one or more BWPs to determine which is the active BWP for the first subscription. For instance, the network entity may transmit a response to the SR on the second BWP, which is the active BWP after the DCI indicating the switch, to the UE and based on the response, the UE may determine to use the second BWP for communicating with the network entity after the tune away gap using the first subscription.

A method for wireless communication at a UE is described. The method may include communicating with a network entity on a first BWP using a first subscription of the UE, communicating with the network entity using a second subscription of the UE during a tune away gap associated with tuning from the first subscription to the second subscription, transmitting, to the network entity using the first subscription, an SR on each of multiple BWPs configured for the UE after the tune away gap, and receiving, from the network entity, a resource grant on a second BWP based on transmitting the SR on each of the multiple BWPs configured for the UE.

An apparatus for wireless communication at a UE is described. The apparatus may include a processor, memory coupled with the processor, and instructions stored in the memory. The instructions may be executable by the processor to cause the apparatus to communicate with a network entity on a first BWP using a first subscription of the UE, communicate with the network entity using a second subscription of the UE during a tune away gap associated with tuning from the first subscription to the second subscription, transmit, to the network entity using the first subscription, an SR on each of multiple BWPs configured for the UE after the tune away gap, and receive, from the network entity, a resource grant on a second BWP based on transmitting the SR on each of the multiple BWPs configured for the UE.

Another apparatus for wireless communication at a UE is described. The apparatus may include means for communicating with a network entity on a first BWP using a first subscription of the UE, means for communicating with the network entity using a second subscription of the UE during a tune away gap associated with tuning from the first subscription to the second subscription, means for transmitting, to the network entity using the first subscription, an SR on each of multiple BWPs configured for the UE after the tune away gap, and means for receiving, from the network entity, a resource grant on a second BWP based on transmitting the SR on each of the multiple BWPs configured for the UE.

A non-transitory computer-readable medium storing code for wireless communication at a UE is described. The code may include instructions executable by a processor to communicate with a network entity on a first BWP using a first subscription of the UE, communicate with the network entity using a second subscription of the UE during a tune away gap associated with tuning from the first subscription to the second subscription, transmit, to the network entity using the first subscription, an SR on each of multiple BWPs configured for the UE after the tune away gap, and receive, from the network entity, a resource grant on a second BWP based on transmitting the SR on each of the multiple BWPs configured for the UE.

In some examples of the method, apparatuses, and non-transitory computer-readable medium described herein, transmitting the SR on each of the multiple BWPs configured for the UE may include operations, features, means, or instructions for transmitting a first set of one or more SRs on the first BWP after the tune away gap and transmitting a second SR on the second BWP after the tune away gap based on a condition being satisfied.

Some examples of the method, apparatuses, and non-transitory computer-readable medium described herein may further include operations, features, means, or instructions for determining that the condition may be satisfied based on a failure to receive one or more resource grants from the network entity on the first BWP responsive to the first set of one or more SRs for a threshold quantity of slots.

Some examples of the method, apparatuses, and non-transitory computer-readable medium described herein may further include operations, features, means, or instructions for determining the threshold quantity of slots based on a decoding history of the UE, the decoding history associated with a success rate of previous decoding attempts by the UE using the first subscription.

Some examples of the method, apparatuses, and non-transitory computer-readable medium described herein may further include operations, features, means, or instructions for determining the threshold quantity of slots based on a scheduling rate of the UE, the scheduling rate associated with a percentage of previous slots during which the UE may be scheduled for communication with the network entity using the first subscription.

Some examples of the method, apparatuses, and non-transitory computer-readable medium described herein may further include operations, features, means, or instructions for starting a timer for restricting SR transmissions based on one of the first set of one or more SRs and transmitting the second SR on the second BWP during an earliest available SR occasion of the second BWP that may be before an expiration of the timer, where the condition may be satisfied before the expiration of the timer.

Some examples of the method, apparatuses, and non-transitory computer-readable medium described herein may further include operations, features, means, or instructions for monitoring for the resource grant from the network entity on each of the multiple BWPs on which the UE transmits the SR, where receiving the resource grant on the second BWP may be based on monitoring for the resource grant on each of the multiple BWPs.

Some examples of the method, apparatuses, and non-transitory computer-readable medium described herein may further include operations, features, means, or instructions for receiving, from the network entity, one or more control messages that indicate a set of BWPs that may be available to the UE for communication with the network entity and that indicate a set of control resources for each BWP of the set of BWPs, the set of BWPs including at least the first BWP and the second BWP, where transmitting the SR on each of the multiple BWPs may be based on receiving the one or more control messages that indicate the set of BWPs that may be available to the UE and the set of control resources for each BWP of the set of BWPs.

In some examples of the method, apparatuses, and non-transitory computer-readable medium described herein, for each BWP of the set of BWPs that may be available to the UE, the UE transmits the SR on a respective BWP using a respective set of control resources and monitors for the resource grant from the network entity on that BWP sequentially.

Some examples of the method, apparatuses, and non-transitory computer-readable medium described herein may further include operations, features, means, or instructions for releasing a set of radio frequency resources associated with the first subscription for a duration of the tune away gap from the first subscription, where transmitting the SR on each of the multiple BWPs may be based on releasing the set of radio frequency resources associated with the first subscription for the duration of the tune away gap.

Some examples of the method, apparatuses, and non-transitory computer-readable medium described herein may further include operations, features, means, or instructions for transmitting, to the network entity on the second BWP using the first subscription, an uplink message based on receiving the resource grant on the second BWP.

DETAILED DESCRIPTION

Figure 1:
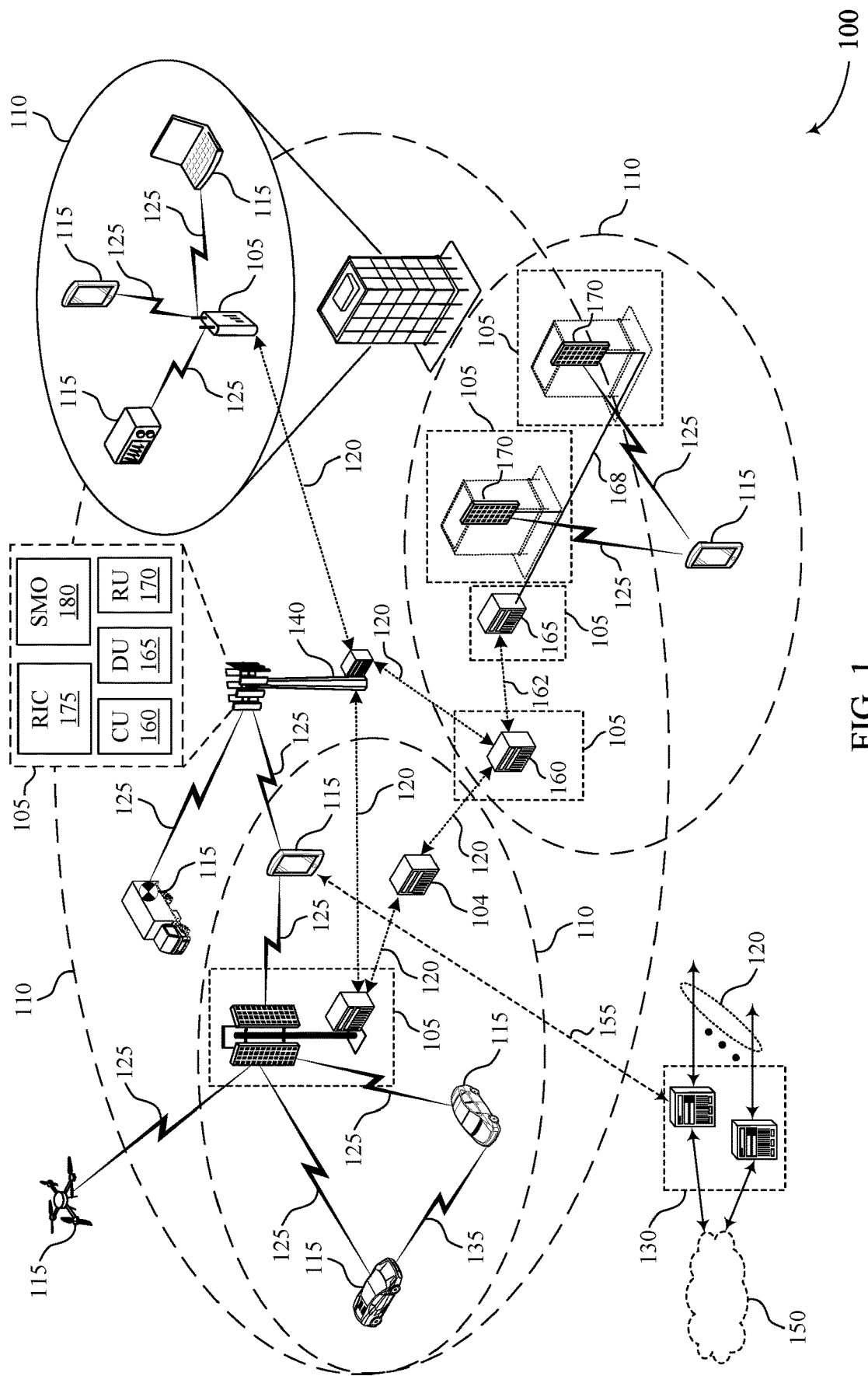
FIGS. 1 and 2 show examples of wireless communications systems that support control mechanisms for bandwidth part (BWP) switching for multiple subscribers in accordance with one or more aspects of the present disclosure.

In some wireless communications systems, a user equipment (UE) may support multiple subscriber identification modules (SIMs) and may operate in a multi-SIM (MSIM) mode. Each SIM supported by the UE may be associated with a respective subscription and at least one SIM may be associated with or otherwise referred to as a default data SIM (DDS) subscription. In the context of such an MSIM mode and in scenarios in which the DDS is usable for communication with a network entity (e.g., a New Radio (NR) network entity), the UE may switch from a DDS subscription to another subscription during a tune away gap and, during such a tune away gap, the UE may be unable to transmit or receive communications associated with the DDS subscription (e.g., the NR subscription). As such, the UE may be unable to receive downlink signaling within the tune away gap using the DDS subscription and, accordingly, may be unaware of the content or information included in such downlink signaling. For example, if a network entity transmits downlink control information (DCI) indicating a switch from a first bandwidth part (BWP) to a second BWP for the DDS subscription during the tune away gap, the UE may fail to receive the DCI and may be unaware of any the switch from the first BWP to the second BWP for the DDS subscription. Similar issues may arise for the non-DDS subscription when the UE switches from the non-DDS subscription to the DDS subscription and the UE does not receive message for the non-DDS subscription while operating using the DDS subscription during the tune away gap.

In some implementations, a UE, which is configured with multiple BWPs and supports an MSIM mode, may support a signaling mechanism that enables the UE to switch to a different BWP or identify the active BWP for a first subscription in cases where the UE does not receive (e.g., misses) a command indicating the switch to the active BWP from a network entity. For example, after resuming operation or resuming monitoring of the DDS subscription (e.g., after resuming from a tune away gap), the UE may perform one or more uplink scheduling request (SR) transmissions on each of one or more other BWPs that are configured for the UE (e.g., including the second BWP). The uplink SR transmission may be performed after a threshold time period during which the UE fails to receive scheduling information from the network entity (e.g., scheduling information is not received on the previously active BWP for the first subscription or in response to an SR transmitted by the UE on the first subscription). In some aspects, the UE may perform an uplink SR transmission on each of the one or more other BWPs that are configured for the UE on a respective first available SR occasion associated with that BWP and may monitor for any downlink signaling from the network entity responsive to the SR transmission on that BWP. In accordance with the switch to the second BWP and the SR transmissions from the UE on each of potentially multiple BWPs, the network entity may receive an SR transmission from the UE on the second BWP (e.g., the active BWP from the perspective of the network entity) and may respond with an uplink grant on the second BWP. The UE may receive the uplink grant on the second BWP and may detect or otherwise determine that a BWP switch occurred during the tune away gap and that the second BWP is the active BWP for the first subscription. The UE may continue to communicate with the network entity using the second BWP and the first subscription.

Particular implementations of the subject matter described in this disclosure can be implemented to realize one or more of the following potential advantages. For example, in accordance with autonomously switching to a different BWP despite a missed command from the network entity, the UE may achieve higher performance and more seamlessly perform an uplink data transfer after the tune away gap. Further, in implementations in which the UE transmits SRs on each of the other BWPs (e.g., outside of the first BWP that was initially the active BWP) configured for the UE together, the UE may expedite resuming operation on the active BWP. Accordingly, the UE and the network entity may experience higher reliability, which may support higher data rates, greater system capacity, and greater spectral efficiency, among other benefits.

Aspects of the disclosure are initially described in the context of wireless communications systems. Aspects of the disclosure are additionally illustrated by and described with reference to a process flow. Aspects of the disclosure are further illustrated by and described with reference to apparatus diagrams, system diagrams, and flowcharts that relate to control mechanisms for BWP switching for multiple subscribers.

FIG. 1 shows an example of a wireless communications system 100 that supports control mechanisms for BWP switching for multiple subscribers in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support control mechanisms for BWP switching for multiple subscribers as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, MC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots.

Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or expected (e.g., critical) functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some systems, such as the wireless communications system 100, a UE 115 may support multiple SIMS and may operate in an MSIM mode. Each SIM supported by the UE 115 may be associated with a respective subscription and at least one SIM may be associated with or otherwise referred to as a DDS subscription. In the context of such an MSIM mode and in scenarios in which the DDS subscription is usable for communication with a network entity 105 (e.g., an NR network entity), the UE 115 may initiate a tune away gap for operating using another subscription and, during such a tune away gap, the UE 115 may be unable to transmit or receive communications associated with the DDS subscription (e.g., the NR subscription). As such, the UE 115 may be unable to communicate messages within the tune away gap using the DDS subscription and, accordingly, may be unaware of any instructions that may be sent (e.g., via downlink signaling) to the UE. For example, if a network entity 105 transmits DCI indicating a switch from a first BWP to a second BWP for the DDS subscription during the tune away gap, the UE 115 may fail to receive the DCI and, accordingly, may be unaware of any instruction to switch to the second BWP when the UE 115 transitions back to the first subscription.

In some implementations, the UE 115 (e.g., a UE 115 configured with multiple BWPs and in an MSIM mode) may support a signaling mechanism according to which the UE 115 is able to autonomously switch to a different BWP despite a missed command from a network entity 105. For example, after resuming operation or resuming monitoring of the DDS subscription (e.g., after resuming from the tune away gap) and after a threshold time period during which the UE 115 fails to receive scheduling information from the network entity 105, the UE 115 may perform one or more uplink SR transmissions on each of one or more other BWPs that are configured for the UE 115 (e.g., including the second BWP). In some aspects, the UE 115 may perform an uplink SR transmission on each of the one or more other BWPs that are configured for the UE 115 on a respective first available SR occasion associated with that BWP and may monitor for any downlink signaling from the network entity 105 responsive to the SR transmission on that BWP. For example, in scenarios in which the UE 115 is configured with the first BWP, the second BWP, and a third BWP, the UE 115 may transmit one or more SRs on the second BWP and the third BWP and may monitor for any responsive signaling from the network entity 105 on the second BWP and the third BWP accordingly.

In accordance with the switch from the first BWP to the second BWP and the SR transmissions from the UE 115 on each of potentially multiple BWPs, the network entity 105 may receive an SR transmission from the UE 115 on the second BWP (e.g., the active BWP from the perspective of the network entity 105) and may respond with an uplink grant on the second BWP. The UE 115 may receive the uplink grant on the second BWP and may detect or otherwise assume that a BWP switch occurred during the tune away gap accordingly. As such, the UE 115 may assume that the second BWP is a correct BWP for the UE 115 and may continue to communicate with the network entity 105 on the second BWP.

Figure 2:
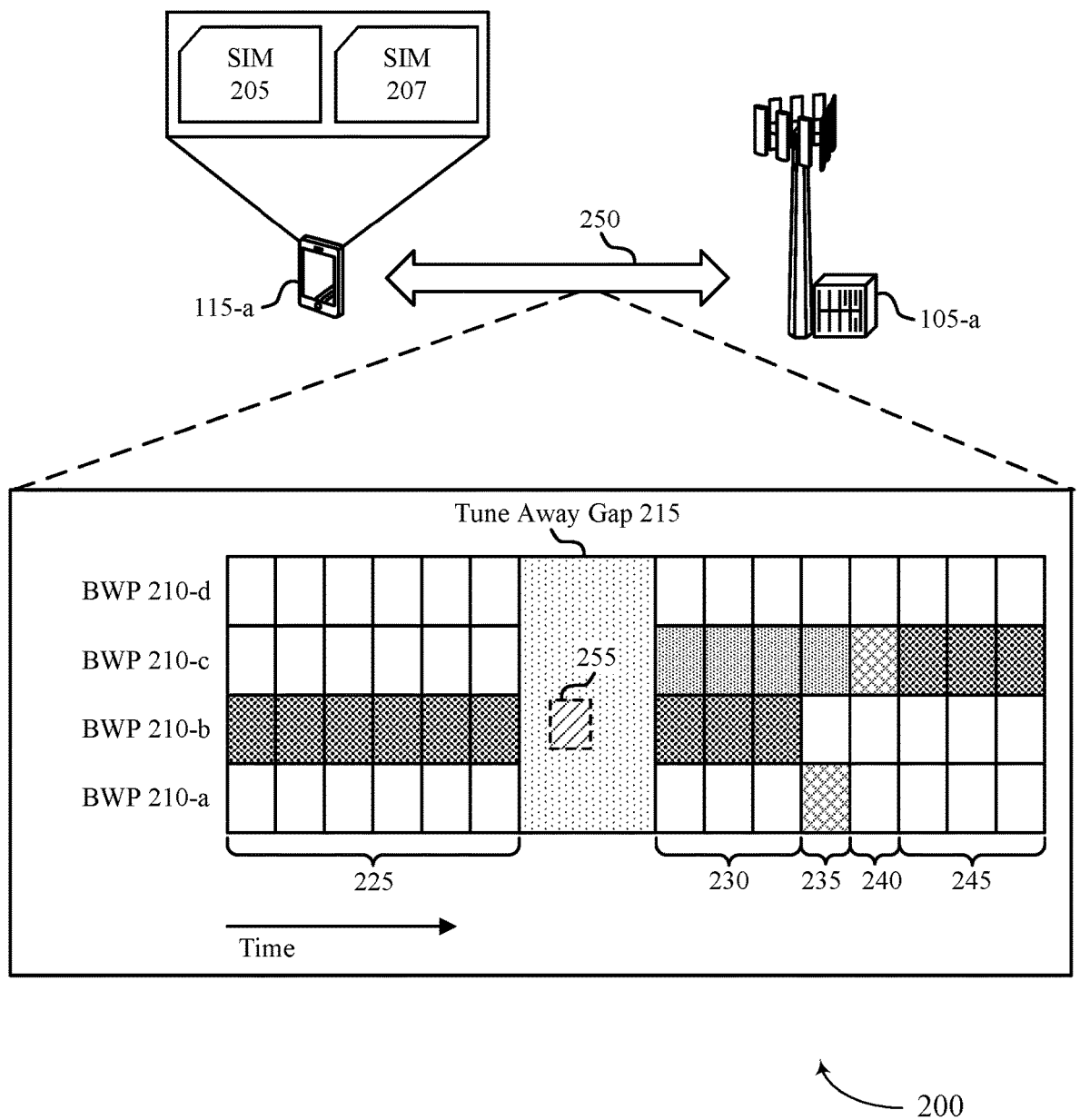

FIG. 2 shows an example of a wireless communications system 200 that supports control mechanisms for BWP switching for multiple subscribers in accordance with one or more aspects of the present disclosure. In some examples, the wireless communications system 200 may implement or be implemented to realize aspects of the wireless communications system 100. For example, the wireless communications system 200 may illustrate communication between a network entity 105-a and a UE 115-a, which may be examples of corresponding devices as illustrated by and described with reference to FIG. 1. The UE 115-a may be an example of an MSIM device, such as a dual-SIM device or a dual-subscription device, and may support multiple subscriptions (more than two) in the context of an MSIM mode.

For example, the UE 115-a may at least support a first subscription (which may be an example of or otherwise function as a DDS subscription) via a first SIM 205 and a second subscription (which may be an example of or otherwise function as an nDDS subscription) via a second SIM 207. In other words, the first SIM 205 may provide or support the first subscription and the second SIM 207 may provide or support a second subscription for the UE 115-a. The first subscription and the second subscription may be associated with a same cell or different cells and may be associated with a same radio access technology (RAT) or different RATs. In an example, the first subscription may provide one of an NR subscription, an LTE subscription, a 4G subscription a global system for mobile communications (GSM) subscription, or a wideband code division multiple access (WCDMA) subscription and the second subscription may provide one of an NR subscription, an LTE subscription, a 4G subscription, a GSM subscription, or a WCDMA subscription. Further, the UE 115-a may support communications with multiple base stations at a time in accordance with supporting multiple subscriptions and may be configured to support dual-connectivity or other non-standalone communications schemes.

In some aspects, the UE 115-a may communicate with the network entity 105-a via a communication link 250 using the first subscription (e.g., an NR subscription). For example, the UE 115-a may transmit data or control signaling, or both, to the network entity 105-a using the first subscription and the UE 115-a may receive data or control signaling, or both, from the network entity 105-a using the first subscription. In some examples, downlink activity between the network entity 105-a and the UE 115-a may include one or more actions or messages from the network entity 105-a for which the network entity 105-a may expect the UE 115-a to respond (e.g., for which the UE 115-a may be expected to be able to respond). For example, the network entity 105-a may configure the UE 115-a with multiple BWPs, may transmit a DCI message for a BWP switch to the UE 115-a, and may expect the UE 115-a to switch BWPs in accordance with the DCI message. For instance, the network entity 105-a may configure the UE 115-a with a BWP 210-a, a BWP 210-b, a BWP 210-c, and a BWP 210-d (e.g., the UE 115-a can be configured with up to four BWPs in the downlink with a single downlink BWP being active at a given time). In such examples in which the network entity 105-a configures the UE 115-a with multiple BWPs, the network entity 105-a may be able to switch the BWP of the UE 115-a via a DCI format 1_1 or a DCI format 0_1 through a BWP indicator field.

Further, the UE 115-a may operate in accordance with a full tune-away (non-dual receive) or a hybrid fallback mode. In the example of full tune-away, data traffic from the first subscription may be tuned away to the second subscription in an idle state. For example, in full tune-away mode, NR traffic on the first subscription may lose radio frequency resources to other RAT resources on the second subscription for a duration of activity on the second subscription. The UE 115-a or the network entity 105-a may invoke the full tune-away or hybrid fallback mode if the other RAT experiences poor paging performance (e.g., when the UE 115-a detects a threshold quantity of consecutive page decode failures or a threshold quantity of transceiver resource manager (TRM) denials for page decode). In such cases, the UE 115-a may fall back to a tune-away mode to enhance paging performance. Additionally, or alternatively, the full tune-away or hybrid fallback mode may be invoked when the other RAT enters an access or traffic state for a mobile originated or mobile terminated voice call, a mobile originated or mobile terminated messaging on traffic channel, or a location area update (LAU). In some examples, the UE 115-a or the network entity 105-a may invoke the full tune-away or hybrid fallback mode if a technology enters an acquisition state.

As such, the UE 115-a may 'tune away' from the first subscription (e.g., the DDS or NR subscription) for a time period for some activity by the second subscription (e.g., the other subscription). Such a time period may be referred to as a tune away gap 215 and may refer to a time period during which the UE 115-a performs activity (e.g., one or more transmissions or one or more receptions, or any combination thereof) using the second subscription and is unable to transmit or receive using the first subscription. In other words, the UE 115-a may open the tune away gap 215 for some activity by the second subscription and may be unable to perform activity (e.g., transmit or receive, such as decode a physical downlink control channel (PDCCH)) using the first subscription for a duration of the tune away gap 215. The network entity 105-a, however, may be unaware of a timing or duration of the tune away gap 215 and there may be downlink or uplink activity that can be performed by the first subscription (e.g., the NR subscription) during the tune away gap 215. For example, the network entity 105-a may transmit an indication of a BWP switch 255 to the UE 115-a via the first subscription during the tune away gap 215.

During such instances in which the network entity 105-a transmits an indication of a BWP switch 255 for the UE 115-a (e.g., via a DCI format 1_1 or a DCI format 0_1 for BWP switch) that falls within the tune away gap 215, the UE 115-a may be unaware of the action set by the network entity 105-a and, after resuming operation using the first subscription after the tune away gap 215, the UE 115-a may search or monitor for communications from the network entity 105-a on a BWP that was active for the UE 115-a before the tune away gap 215 (e.g., the BWP 210-b). As such, the UE 115-a may still operate and perform downlink decodes or uplink transmissions, or both, on an incorrect BWP (e.g., on a different BWP than what the network entity 105-a configured to be active via the missed indication of the BWP switch 255) and may not expect to receive (e.g., may not list for) communications outside of the BWP 210 that the UE 115-a expects to be the active BWP 210.

Such communications that the UE 115-a may not expect to receive outside of the BWP 210 that the UE 115-a expects is the active BWP may include a physical downlink shared channel (PDSCH) transmission, a PDCCH transmission, or a CSI-RS (except for radio resource management). For example, and as illustrated by the wireless communications system 200, the UE 115-*a* and the network entity 105-*a* may both use the BWP 210-*b* as an active BWP for a set of slots 225 prior to the tune away gap 215, but the network entity 105-*a* may transmit a DCI including an indication of a BWP switch 255 from the BWP 210-*b* to the BWP 210-*c* during the tune away gap 215. As such, after the tune away gap 215, the network entity 105-*a* may use the BWP 210-*c* as an active BWP while the UE 115-*a* still expects the BWP 210-*b* to be the active BWP.

As an example, an NR DDS subscription may be in an active data call and may be receiving active downlink or uplink data (e.g., assuming greater than a 50% scheduling rate) and may actively decode a PDCCH for DCI format 1_1 or DCI format 0_1, or both. Tune away gaps 215 may be prone to happen, however, in which case an NR stack may be relinquished, a radio frequency outage may happen due to a lack of baseband or radio frequency resources during the tune away gap 215 and post resume from the tune away, and the NR DDS subscription may resume with PDCCH decode after a successful acquisition. If there is no BWP switch command from the network entity 105-*a* during the tune away gap 215, the UE 115-*a* may continue to perform uplink transmissions and resume uplink data activity. In the case in which the network entity 105-*a* sends a command for or an indication of a BWP switch 255 during the tune away gap 215 (e.g., during which the UE 115-*a* was in a tune away mode), however, the UE 115-*a* may be unaware that any DCI for BWP switch was sent by the network entity 105-*a* and may continue to perform uplink transmissions (and expect downlink transmissions) on the same BWP (e.g., the BWP 210-*b*) as before the tune away gap 215.

For example, the UE 115-*a* may use the NR subscription in data call and decodes happening on the BWP 210-*b* before tune away, the network entity 105-*a* may send an indication of a BWP switch 255 and the downlink DCI transmission including the indication of the BWP switch 255 may fall in the tune away gap 215. As such, the UE 115-*a* may be unable to decode the downlink DCI, the network entity 105-*a* may expect the BWP 210-*c* to be the active BWP while the UE 115-*a* may still send SR transmissions on the BWP 210-*b* after the tune away gap 215 and perform PDCCH decodes for uplink grants in response to the SR transmissions on the BWP 210-*b*, and the network entity 105-*a* may fail to send any such uplink grants as a result of monitoring the BWP 210-*c* for communications from the UE 115-*a*. In other words, the network entity 105-*a* may expect communications with the UE 115-*a* to occur on the BWP 210-*c* after the indication of the BWP switch 255. As such, and because the BWP switch occurred from the network side, the UE 115-*a* may not receive any DCI on a PDCCH for uplink grant in response to an SR 220 that the UE 115-*a* sends to the network entity 105-*a* and the UE 115-*a* may assume that no uplink or downlink data is scheduled by the network entity 105-*a* (even as the network entity 105-*a* may be trying to schedule uplink and downlink data for the UE 115-*a* on the BWP 210-*c*). Accordingly, the UE 115-*a* and the network entity 105-*a* may miss data transmissions and eventually experience further delays or radio link control (RLC) throttling, an RLC reset, or a radio link failure (RLF).

In some implementations, the UE 115-*a* may support a procedure which may handle such a situation robustly. In accordance with such a procedure, the UE 115-*a* may send an SR 220 for an uplink grant on other configured BWPs 210 after resuming from the tune away gap 215. For example, the UE 115-*a* may be aware of information associated with control resources of the other BWPs 210 that are configured for the UE 115-*a* and after resuming operation on the first subscription from the tune away gap 215, the UE 115-*a* may perform an uplink transmission for an SR 220 on one or more of the other configured BWPs 210 using such information associated with the control resources of the other BWPs 210 that are configured for the UE 115-*a*. Such information associated with the control resources of the BWPs 210 may include control resource set (CORESET) information or search space set information of each of the BWPs 210 and the UE 115-*a* may transmit an SR 220 on a given BWP 210 using resources a CORESET or search space set associated with that given BWP 210. In some aspects, the UE 115-*a* may transmit an SR 220 on one or more of the other BWPs 210 that are configured for the UE 115-*a* on their respective first available SR-occasions (e.g., without waiting for sr-prohibit timer expiry) and may perform a PDCCH decode attempt on the one or more of the other configured BWPs 210 respectively.

In some implementations, the UE 115-*a* may trigger the procedure for handling a potentially missed indication of a BWP switch 255 under specific conditions (e.g., if the UE 115-*a* determines, identifies, or otherwise ascertains that one or more specific conditions are satisfied). For example, the UE 115-*a* may transmit one or more SRs 220 on one or more other BWPs 210 configured for the UE 115-*a* after a set of slots 230. In other words, the UE 115-*a* may begin transmitting SRs 220 on the one or more other BWPs 210 after a threshold quantity of slots during which the UE 115-*a* fails to communicate with the network entity 105-*a* (e.g., during which the UE 115-*a* fails to receive an uplink or downlink grant from the network entity 105-*a* or otherwise fails to successfully communicate in an expected manner with the network entity 105-*a*). The UE 115-*a* set or configure the threshold quantity of slots (e.g., how many slots to wait before pursuing a PDCCH attempt on another BWP 210 after the tune away gap 215) based on a past DCI decode history or a percentage scheduling rate, or both.

For example, the UE 115-*a* may set the threshold quantity of slots to a relatively greater quantity of slots if a past DCI decode history indicates or suggests that the network entity 105-*a* transmits DCI relatively infrequently or indicates that the UE 115-*a* relatively frequently fails DCI decodes. For example, if the DCI decode history indicates that DCI is successfully received in approximately 100% of slots, the UE 115-*a* may set the threshold quantity of slots to one. If the DCI decode history indicates that DCI is successfully received in approximately 50% of slots, the UE 115-*a* may set the threshold quantity of slots to two or, if the DCI decode history indicates that DCI is successfully received in approximately 33% of slots, the UE 115-*a* may set the threshold quantity of slots to three. For further example, if the DCI decode history indicates that DCI is successfully received in approximately 25% of slots, the UE 115-*a* may set the threshold quantity of slots to four, and so on.

Additionally, or alternatively, the UE 115-*a* may set the threshold quantity of slots to a relatively greater quantity of slots if a percentage scheduling rate is relatively low. For example, if the scheduling rate is approximately 100%, the UE 115-*a* may set the threshold quantity of slots to one. If the scheduling rate is approximately 50%, the UE 115-*a* may set the threshold quantity of slots to two or, if the scheduling rate is approximately 33%, the UE 115-*a* may set the threshold quantity of slots to three. For further example, if the scheduling rate is approximately 25%, the UE 115-*a* may set the threshold quantity of slots to four. In either or both examples, the UE 115-*a* may consider a failure to receive an uplink or downlink grant during the initial slots after the tune away gap 215 as being relatively regular or expected. In some aspects, and as illustrated by the wireless communications system 200, the UE 115-a may set or configure the threshold quantity of slots to three slots.

Accordingly, the UE 115-a may begin transmitting one or more SRs 220 on other BWPs 210 after the set of slots 230 (e.g., the three slots in accordance with the set or configured threshold). In some implementations, and as illustrated by the wireless communications system 200, the UE 115-a may transmit an SR 220 to the network entity 105-a on the BWP 210-a during a slot 235 and may monitor for responsive signaling from the network entity 105-a on the BWP 210-a. During or after monitoring for responsive signaling from the network entity 105-a on the BWP 210-a, the UE 115-a may transmit another SR 220 to the network entity 105-a on the BWP 210-c during a slot 240 and may monitor for responsive signaling from the network entity 105-a on the BWP 210-c. In other words, the UE 115-a may perform one or more SR transmission attempts for an uplink grant and may perform corresponding PDCCH decodes on each if not all configured BWPs 210 to detect whether or not a BWP switch occurred during the tune away gap 215.

The network entity 105-a, which considers the BWP 210-c as the active BWP in accordance with the previously transmitted DCI message including the indication of the BWP switch 255, may receive an SR 220 from the UE 115-a on the BWP 210-c and may transmit downlink control signaling (e.g., an uplink grant on a PDCCH of the BWP 210-c) to the UE 115-a on the BWP 210-c accordingly. The UE 115-a may successfully receive the downlink control signaling on the BWP 210-c and may autonomously determine that the BWP 210-c is the active BWP 210 and continue communicating with the network entity 105-a on the BWP 210-c for a set of slots 245 accordingly. In other words, the UE 115-a may transmit an SR 220 on multiple BWPs 210 after the tune away gap 215 and based on determining that a BWP switch likely occurred and the network entity 105-a may send an uplink grant to the UE 115-a on one of the BWPs 210 (e.g., on whichever BWP is active from the perspective of the network entity 105-a, such as the BWP 210-c). The UE 115-a may receive the uplink grant on that one of the BWPs 210 (e.g., on the BWP 210-c) and may detect (e.g., implicitly determine) that a BWP switch has occurred during the tune away gap 215. As such, the UE 115-a may continue to operate on the target BWP (e.g., the BWP 210-c) and may be able to perform an uplink data transfer (e.g., a seamless uplink data transfer) from the BWP 210-b to the BWP 210-c.

Accordingly, the UE 115-a may make a packet switched (PS) call on one NR DDS subscription and open a tune away gap 215 for a duration, such as a long tune away (LTA) duration. During the tune away gap 215 the network entity 105-a (or another signaling entity, such as any signaling entity that may be used in a test or live deployment setting) may send an indication of a BWP switch (e.g., via a DCI format 1_1 or a DCI format 0_1), and, in accordance with the described techniques, the UE 115-a may send one or more SRs 220 on one or more BWPs 210 other than a previously active BWP 210.

Further, although illustrated and described in the context of a scenario in which the UE 115-a transmits an SR 220 on the BWP 210-a during the slot 235 and transmits an SR 220 on the BWP 210-c during the slot 240, the UE 115-a may additionally, or alternatively, transmit an SR 220 to the network entity 105-a on the BWP 210-d. For example, after the expiration of the threshold quantity of slots (e.g., after the set of slots 230), the UE 115-a may transmit an SR 220 on the BWP 210-a during a first slot, an SR 220 on the BWP 210-c during a second slot, or an SR 220 on the BWP 210-d during a third slot, or any combination thereof.

Additionally, or alternatively, the UE 115-a may transmit multiple SRs 220 on multiple different BWPs 210 during a same or single slot. For example, the UE 115-a may transmit SRs 220 to the network entity 105-a on the BWP 210-a, the BWP 210-c, the BWP 210-d, or any combination thereof, during the slot 235 (e.g., after the set of slots 230 associated with the threshold quantity of slots). In such examples, the UE 115-a may transmit one or more SRs 220 on the BWP 210-a during a first set of one or more symbols, may transmit one or more SRs 220 on the BWP 210-c during a second set of one or more symbols, may transmit one or more SRs 220 on the BWP 210-d during a third set of one or more symbols, or any combination thereof. In some implementations, the UE 115-a may perform an SR transmission attempt for an uplink grant and a corresponding PDCCH decode on all configured BWPs 210 and try to detect a BWP switch.

Figure 3:
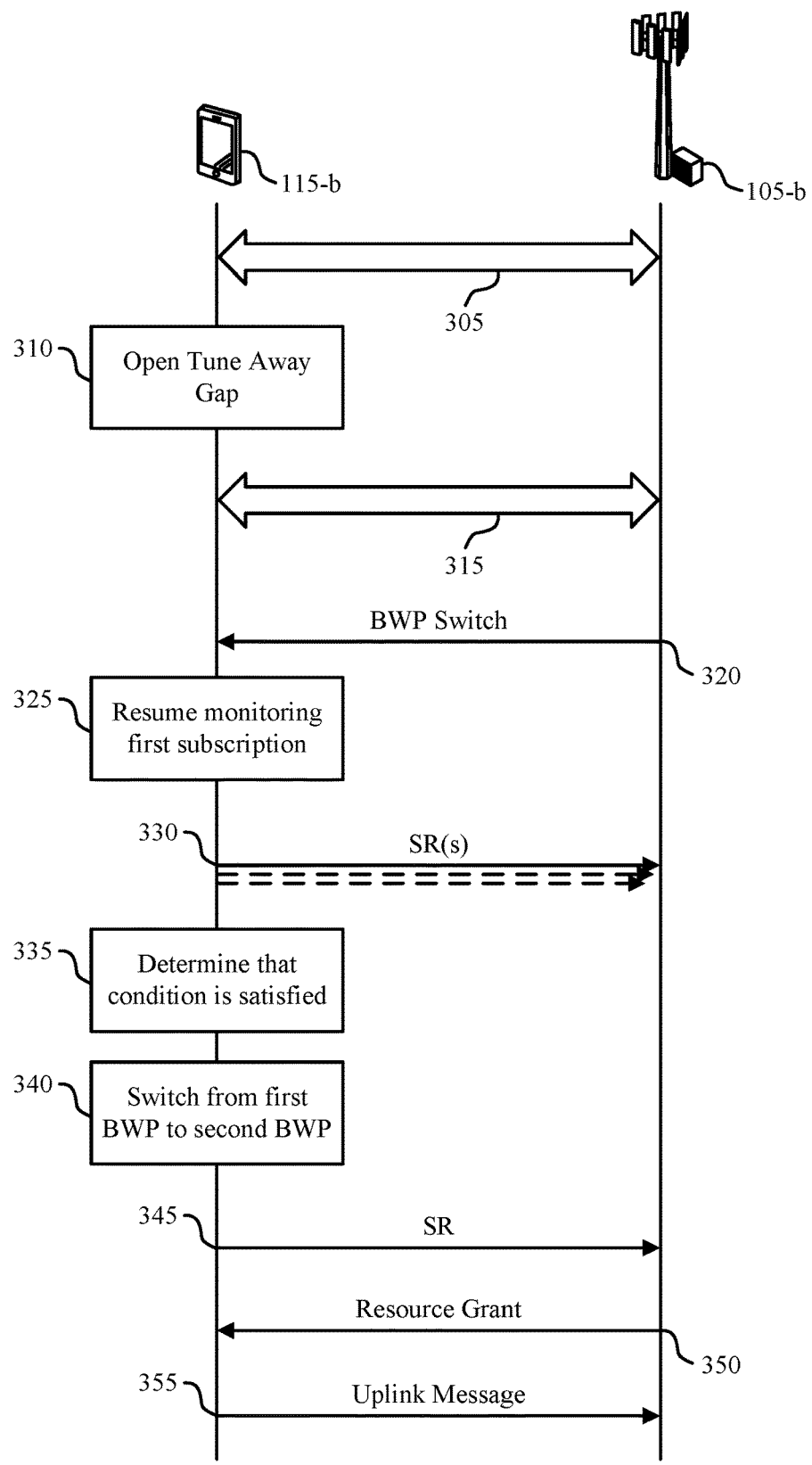
FIG. 3 shows an example of a process flow that supports control mechanisms for BWP switching for multiple subscribers in accordance with one or more aspects of the present disclosure.

FIG. 3 shows an example of a process flow 300 that supports control mechanisms for BWP switching for multiple subscribers in accordance with one or more aspects of the present disclosure. The process flow 300 may implement or be implemented by aspects of the wireless communications system 100 or the wireless communications system 200. For example, the process flow 300 illustrates communication between a UE 115-b and a network entity 105-b, which may be examples of corresponding devices as illustrated by and described with reference to FIGS. 1 and 2. In some implementations, the UE 115-b may autonomously determine whether the UE 115-b potentially missed a DCI message indicating a BWP switch during a tune away gap (e.g., a tune away gap 215) and may support an SR-based signaling mechanism according to which the UE 115-a may autonomously switch to a target BWP despite the missed DCI message.

In the following description of the process flow 300, the operations may be performed (such as reported or provided) in a different order than the order shown, or the operations performed by the example devices may be performed in different orders or at different times. Some operations also may be left out of the process flow 300, or other operations may be added to the process flow 300. Further, although some operations or signaling may be shown to occur at different times for discussion purposes, these operations may actually occur at the same time.

At 305, the UE 115-b may communicate with the network entity 105-b on a first BWP using a first subscription of the UE 115-b. For example, the UE 115-b may transmit or receive one or more messages to or from the network entity 105-b.

At 310, the UE 115-b may open a tune away gap for some activity using the second subscription. For example, the tune away gap may be associated with or otherwise involve a tuning from the first subscription to the second subscription. In some aspects, the UE 115-b may release a set of resources (e.g., a set of radio frequency resources) associated with the first subscription as part of the tune away to the second subscription and, as such, may be unable to communicate with the network entity 105-b using the first subscription for a duration of the tune away gap.

At 315, the UE 115-b may communicate with the network entity 105-b using the second subscription of the UE 115-b during the tune away gap.

At 320, the network entity 105-b may transmit, to the UE 115-b using the first subscription, an indication of a BWP switch (e.g., via a DCI message) to the UE 115-b during the tune away gap. In some aspects, the indication of the BWP switch may indicate a switch from the first BWP as the active BWP to a second BWP as the active BWP. The UE 115-*b* may be unable to receive the indication of the BWP switch based on the indication being transmitted during the tune away gap from the first subscription and, accordingly, the UE 115-*b* may be unaware that the network entity 105-*b* expects the UE 115-*b* to switch from the first BWP to the second BWP.

At 325, the UE 115-*b* may resume monitoring the first subscription. For example, the UE 115-*b* may revert to communicating with the network entity 105-*b* using the first subscription after the tune away gap associated with the second subscription.

At 330, the UE 115-*b* may transmit, to the network entity 105-*b* using the first subscription, one or more SRs for an uplink message from the UE 115-*b*. For example, each of the one or more SRs may include a request for an uplink resource over which the UE 115-*b* may transmit the uplink message to the network entity 105-*b*.

At 335, the UE 115-*b* may determine that a condition is satisfied. In some implementations, the UE 115-*b* may determine that the condition is satisfied based on a failure to receive, for a threshold quantity of slots, one or more resource grants from the network entity 105-*b* on the first BWP responsive to the one or more SRs that the UE 115-*b* transmitted at 330. In some aspects, the threshold quantity of slots may be based on a decoding history of the UE 115-*b* (e.g., a decoding history associated with a success rate of previous decoding attempts by the UE 115-*b* using the first subscription) or a scheduling rate of the UE 115-*b* (e.g., a scheduling rate associated with a percentage of previous slots during which the UE 115-*b* is scheduled for communication with the network entity 105-*b* using the first subscription). In some implementations, the UE 115-*b* may perform SR transmissions and corresponding PDCCH decode attempts on one or more other BWPs that are configured for the UE 115-*b* based on determining that the condition is satisfied.

At 340, for example, the UE 115-*b* may switch from the first BWP to the second BWP based on determining that the condition is satisfied.

At 345, the UE 115-*b* may transmit an SR on the second BWP using the first subscription and may monitor the second BWP for a resource grant from the network entity 105-*b* responsive to the second BWP. In some aspects, the UE 115-*b* may additionally transmit one or more SRs on one or more other BWPs that are configured for the UE 115-*b*. In some aspects, the UE 115-*b* may transmit the SR on the second BWP during an earliest available SR occasion of the second BWP, which may be present prior to an expiration of a timer (e.g., an sr-prohibit timer) associated with restricting SR transmissions based on any one of the one or more SRs transmitted at 330.

At 350, the UE 115-*b* may receive a resource grant from the network entity 105-*b* on the second BWP using the first subscription based on monitoring for the resource grant on the second BWP. In some implementations, the UE 115-*b* may determine or assume that the UE 115-*b* likely missed an indication of a BWP switch during the tune away gap based on determining that the condition is satisfies and receiving a resource grant from the network entity 105-*b* on the second BWP (e.g., a BWP that the UE 115-*b* did not expect to be the active BWP).

At 355, the UE 115-*b* may transmit, to the network entity 105-*b* on the second BWP using the first subscription, an uplink message based on receiving the resource grant on the second BWP. Further, the UE 115-*b* may continue to communicate with the network entity 105-*b* on the second BWP after determining that the UE 115-*b* likely missed an indication of a BWP switch.

Figure 4:
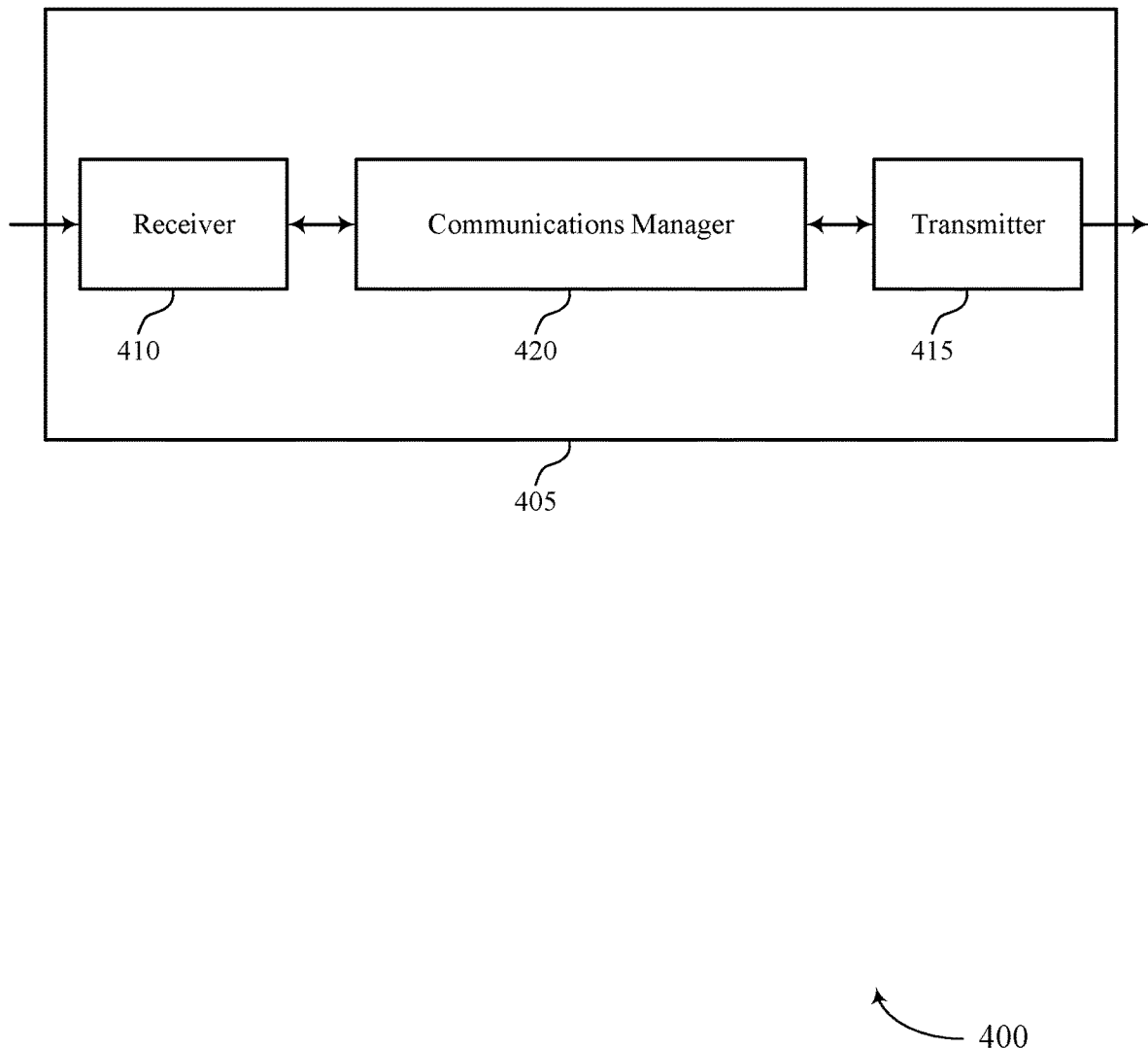
FIGS. 4 and 5 show block diagrams of devices that support control mechanisms for BWP switching for multiple subscribers in accordance with one or more aspects of the present disclosure.

FIG. 4 shows a block diagram 400 of a device 405 that supports control mechanisms for BWP switching for multiple subscribers in accordance with one or more aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to control mechanisms for BWP switching for multiple subscribers). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to control mechanisms for BWP switching for multiple subscribers). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of control mechanisms for BWP switching for multiple subscribers as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communication at a UE in accordance with examples as disclosed herein. For example, the communications manager 420 may be configured as or otherwise support a means for communicating with a network entity on a first BWP using a first subscription of the UE. The communications manager 420 may be configured as or otherwise support a means for communicating with the network entity using a second subscription of the UE during a tune away gap associated with tuning from the first subscription to the second subscription. The communications manager 420 may be configured as or otherwise support a means for transmitting, to the network entity using the first subscription, a scheduling request on each of multiple BWPs configured for the UE after the tune away gap. The communications manager 420 may be configured as or otherwise support a means for receiving, from the network entity, a resource grant on a second BWP based on transmitting the scheduling request on each of the multiple BWPs configured for the UE.

By including or configuring the communications manager 420 in accordance with examples as described herein, the device 405 (e.g., a processor controlling or otherwise coupled with the receiver 410, the transmitter 415, the communications manager 420, or a combination thereof) may support techniques for reduced processing, reduced power consumption, and more efficient utilization of communication resources.

Figure 5:
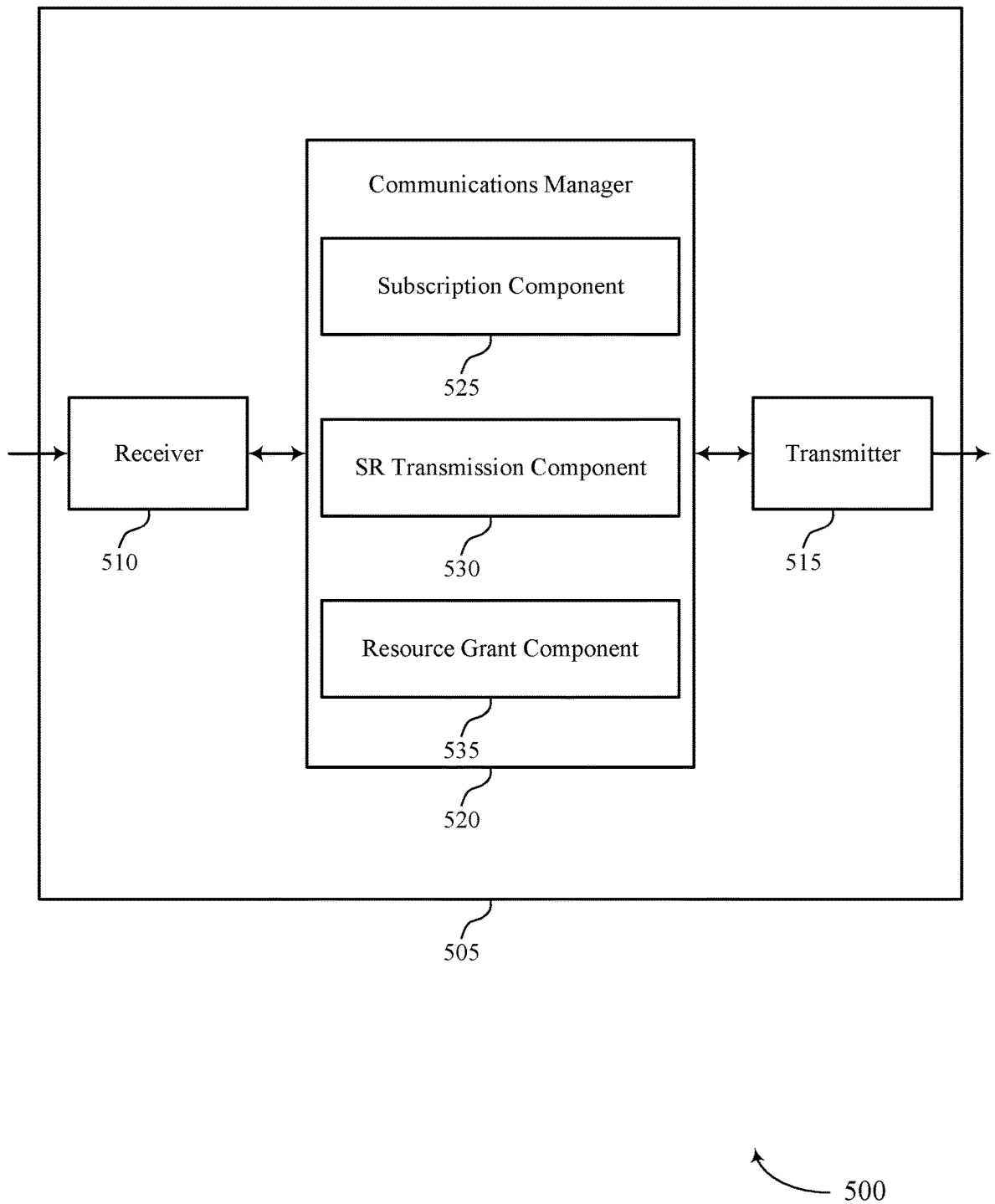

FIG. 5 shows a block diagram 500 of a device 505 that supports control mechanisms for BWP switching for multiple subscribers in accordance with one or more aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to control mechanisms for BWP switching for multiple subscribers). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to control mechanisms for BWP switching for multiple subscribers). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of control mechanisms for BWP switching for multiple subscribers as described herein. For example, the communications manager 520 may include a subscription component 525, an SR transmission component 530, a resource grant component 535, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. The subscription component 525 may be configured as or otherwise support a means for communicating with a network entity on a first BWP using a first subscription of the UE. The subscription component 525 may be configured as or otherwise support a means for communicating with the network entity using a second subscription of the UE during a tune away gap associated with tuning from the first subscription to the second subscription. The SR transmission component 530 may be configured as or otherwise support a means for transmitting, to the network entity using the first subscription, a scheduling request on each of multiple BWPs configured for the UE after the tune away gap. The resource grant component 535 may be configured as or otherwise support a means for receiving, from the network entity, a resource grant on a second BWP based on transmitting the scheduling request on each of the multiple BWPs configured for the UE.

Figure 6:
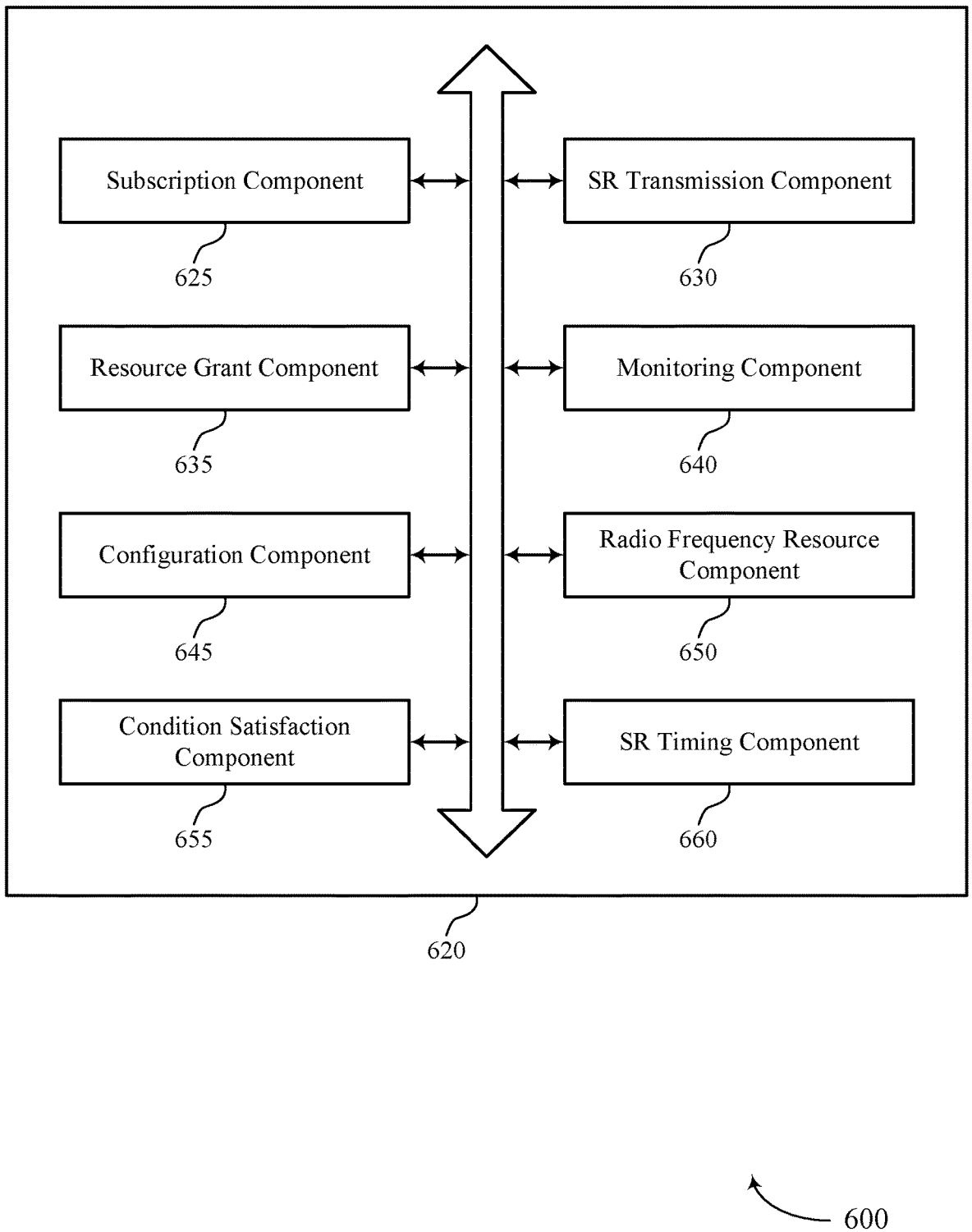
FIG. 6 shows a block diagram of a communications manager that supports control mechanisms for BWP switching for multiple subscribers in accordance with one or more aspects of the present disclosure.

FIG. 6 shows a block diagram 600 of a communications manager 620 that supports control mechanisms for BWP switching for multiple subscribers in accordance with one or more aspects of the present disclosure. The communications manager 620 may be an example of aspects of a communications manager 420, a communications manager 520, or both, as described herein. The communications manager 620, or various components thereof, may be an example of means for performing various aspects of control mechanisms for BWP switching for multiple subscribers as described herein. For example, the communications manager 620 may include a subscription component 625, an SR transmission component 630, a resource grant component 635, a monitoring component 640, a configuration component 645, a radio frequency resource component 650, a condition satisfaction component 655, an SR timing component 660, or any combination thereof. Each of these components may communicate, directly or indirectly, with one another (e.g., via one or more buses).

The communications manager 620 may support wireless communication at a UE in accordance with examples as disclosed herein. The subscription component 625 may be configured as or otherwise support a means for communicating with a network entity on a first BWP using a first subscription of the UE. In some examples, the subscription component 625 may be configured as or otherwise support a means for communicating with the network entity using a second subscription of the UE during a tune away gap associated with tuning from the first subscription to the second subscription. The SR transmission component 630 may be configured as or otherwise support a means for transmitting, to the network entity using the first subscription, a scheduling request on each of multiple BWPs configured for the UE after the tune away gap. The resource grant component 635 may be configured as or otherwise support a means for receiving, from the network entity, a resource grant on a second BWP based on transmitting the scheduling request on each of the multiple BWPs configured for the UE.

In some examples, to support transmitting the scheduling request on each of the multiple BWPs configured for the UE, the SR transmission component 630 may be configured as or otherwise support a means for transmitting a first set of one or more scheduling requests on the first BWP after the tune away gap. In some examples, to support transmitting the scheduling request on each of the multiple BWPs configured for the UE, the SR transmission component 630 may be configured as or otherwise support a means for transmitting a second scheduling request on the second BWP after the tune away gap based on a condition being satisfied.

In some examples, the condition satisfaction component 655 may be configured as or otherwise support a means for determining that the condition is satisfied based on a failure to receive one or more resource grants from the network entity on the first BWP responsive to the first set of one or more scheduling requests for a threshold quantity of slots.

In some examples, the condition satisfaction component 655 may be configured as or otherwise support a means for determining the threshold quantity of slots based on a decoding history of the UE, the decoding history associated with a success rate of previous decoding attempts by the UE using the first subscription.

In some examples, the condition satisfaction component 655 may be configured as or otherwise support a means for determining the threshold quantity of slots based on a scheduling rate of the UE, the scheduling rate associated with a percentage of previous slots during which the UE is scheduled for communication with the network entity using the first subscription.

In some examples, the SR timing component 660 may be configured as or otherwise support a means for starting a timer for restricting scheduling request transmissions based on one of the first set of one or more scheduling requests. In some examples, the SR transmission component 630 may be configured as or otherwise support a means for transmitting the second scheduling request on the second BWP during an earliest available scheduling request occasion of the second BWP that is before an expiration of the timer, where the condition is satisfied before the expiration of the timer.

In some examples, the monitoring component 640 may be configured as or otherwise support a means for monitoring for the resource grant from the network entity on each of the multiple BWPs on which the UE transmits the scheduling request, where receiving the resource grant on the second BWP is based on monitoring for the resource grant on each of the multiple BWPs.

In some examples, the configuration component 645 may be configured as or otherwise support a means for receiving, from the network entity, one or more control messages that indicate a set of BWPs that are available to the UE for communication with the network entity and that indicate a set of control resources for each BWP of the set of BWPs, the set of BWPs including at least the first BWP and the second BWP, where transmitting the scheduling request on each of the multiple BWPs is based on receiving the one or more control messages that indicate the set of BWPs that are available to the UE and the set of control resources for each BWP of the set of BWPs.

In some examples, for each BWP of the set of BWPs that are available to the UE, the UE transmits the scheduling request on a respective BWP using a respective set of control resources and monitors for the resource grant from the network entity on that BWP sequentially.

In some examples, the radio frequency resource component 650 may be configured as or otherwise support a means for releasing a set of radio frequency resources associated with the first subscription for a duration of the tune away gap from the first subscription, where transmitting the scheduling request on each of the multiple BWPs is based on releasing the set of radio frequency resources associated with the first subscription for the duration of the tune away gap.

In some examples, the subscription component 625 may be configured as or otherwise support a means for transmitting, to the network entity on the second BWP using the first subscription, an uplink message based on receiving the resource grant on the second BWP.

Figure 7:
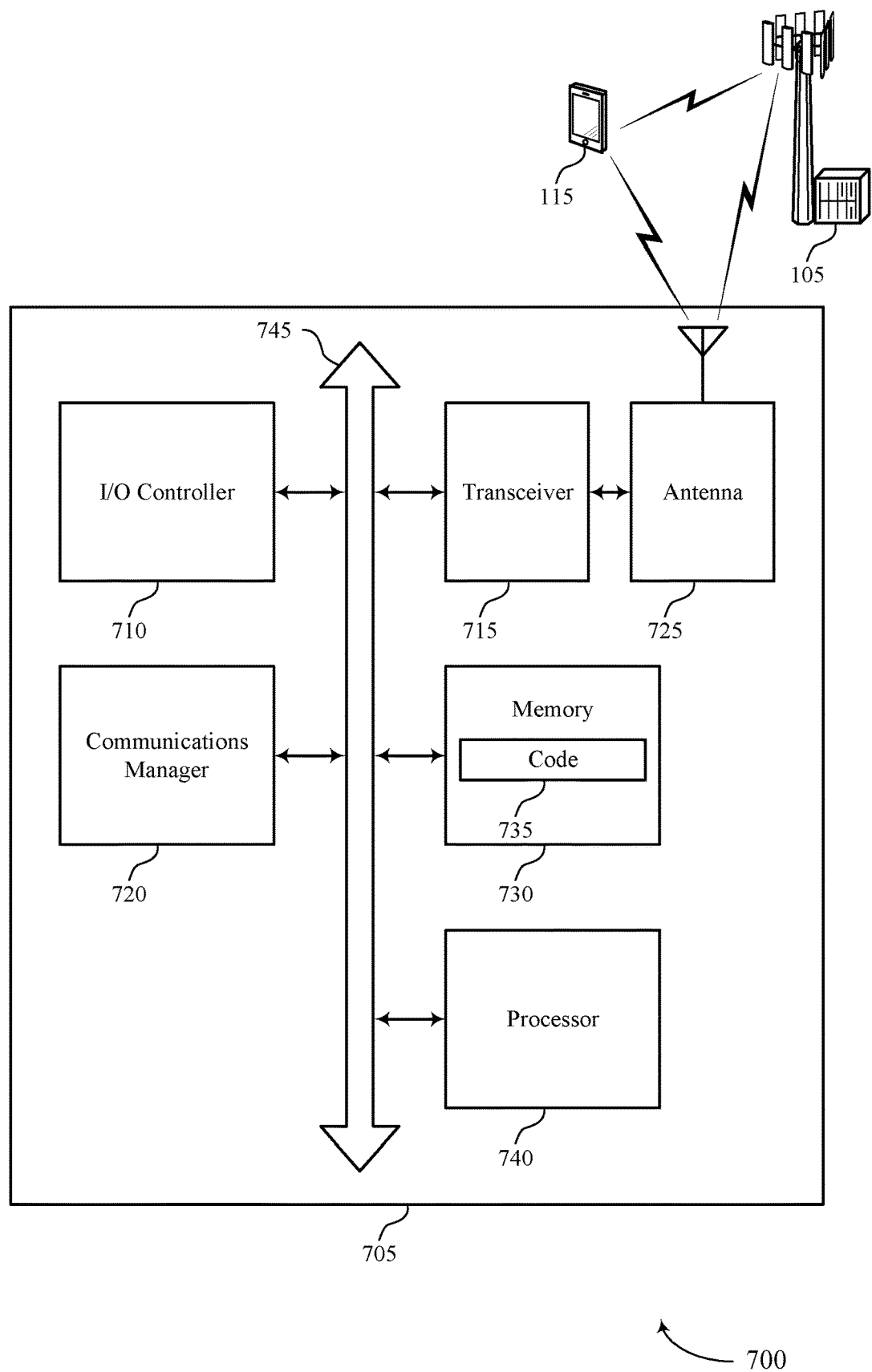
FIG. 7 shows a diagram of a system including a device that supports control mechanisms for BWP switching for multiple subscribers in accordance with one or more aspects of the present disclosure.

FIG. 7 shows a diagram of a system 700 including a device 705 that supports control mechanisms for BWP switching for multiple subscribers in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting control mechanisms for BWP switching for multiple subscribers). For example, the device 705 or a component of the device 705 may include a processor 740 and memory 730 coupled with or to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for communicating with a network entity on a first BWP using a first subscription of the UE. The communications manager 720 may be configured as or otherwise support a means for communicating with the network entity using a second subscription of the UE during a tune away gap associated with tuning from the first subscription to the second subscription. The communications manager 720 may be configured as or otherwise support a means for transmitting, to the network entity using the first subscription, a scheduling request on each of multiple BWPs configured for the UE after the tune away gap. The communications manager 720 may be configured as or otherwise support a means for receiving, from the network entity, a resource grant on a second BWP based on transmitting the scheduling request on each of the multiple BWPs configured for the UE.

By including or configuring the communications manager 720 in accordance with examples as described herein, the device 705 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of control mechanisms for BWP switching for multiple subscribers as described herein, or the processor 740 and the memory 730 may be otherwise configured to perform or support such operations.

Figure 8:
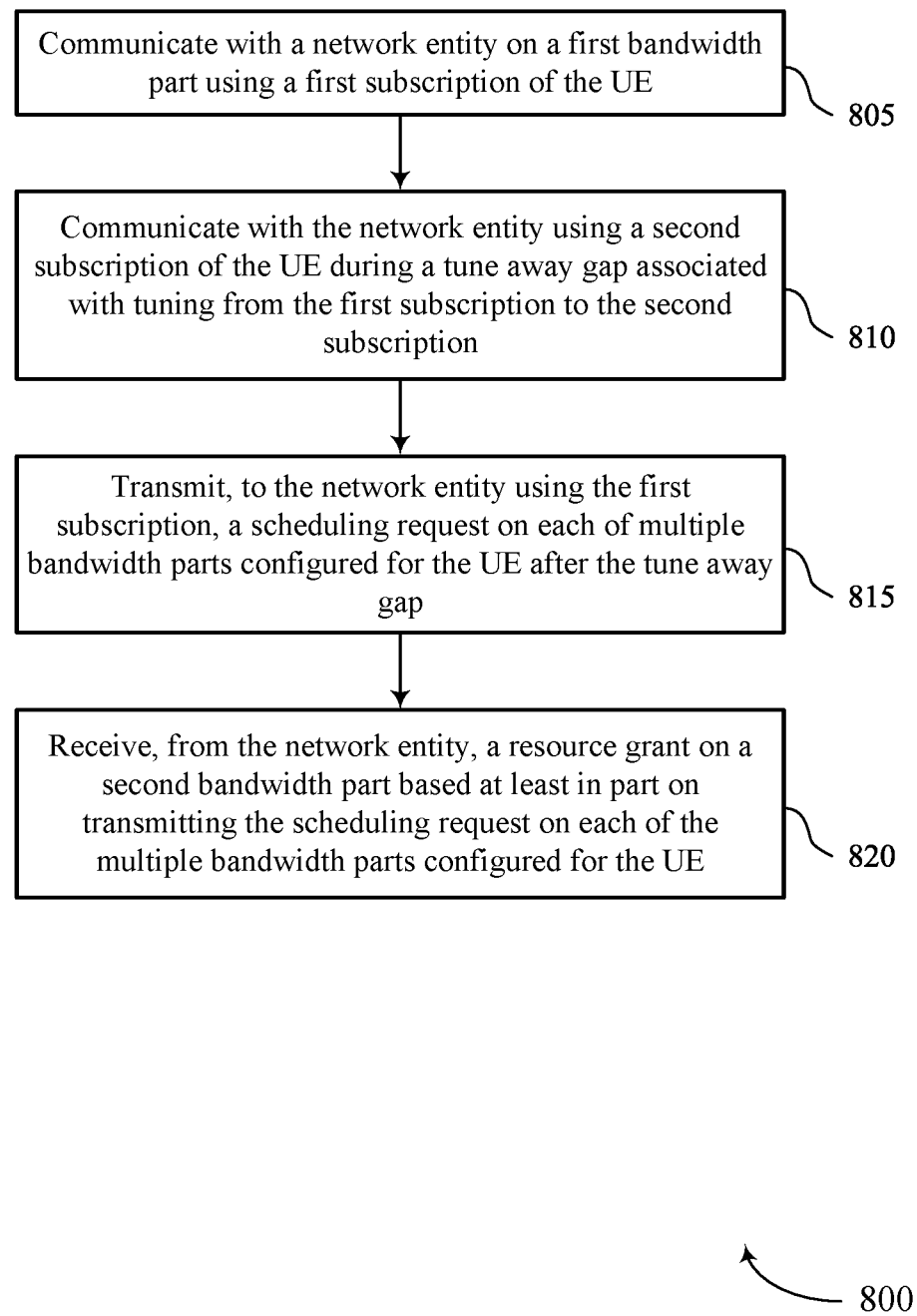
FIG. 8 shows a flowchart illustrating methods that support control mechanisms for BWP switching for multiple subscribers in accordance with one or more aspects of the present disclosure.

FIG. 8 shows a flowchart illustrating a method 800 that supports control mechanisms for BWP switching for multiple subscribers in accordance with one or more aspects of the present disclosure. The operations of the method 800 may be implemented by a UE or its components as described herein. For example, the operations of the method 800 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 805, the method may include communicating with a network entity on a first BWP using a first subscription of the UE. The operations of 805 may be performed in accordance with examples as disclosed herein. In some examples, aspects of the operations of 805 may be performed by a subscription component 625 as described with reference to FIG. 6.

At 810, the method may include communicating with the network entity using a second subscription of the UE during a tune away gap associated with tuning from the first subscription to the second subscription. The operations of 810 may be performed in accordance with examples as disclosed herein. In some examples, aspects of the operations of 810 may be performed by a subscription component 625 as described with reference to FIG. 6.

At 815, the method may include transmitting, to the network entity using the first subscription, a scheduling request on each of multiple BWPs configured for the UE after the tune away gap. The operations of 815 may be performed in accordance with examples as disclosed herein. In some examples, aspects of the operations of 815 may be performed by an SR transmission component 630 as described with reference to FIG. 6.

At 820, the method may include receiving, from the network entity, a resource grant on a second BWP based on transmitting the scheduling request on each of the multiple BWPs configured for the UE. The operations of 820 may be performed in accordance with examples as disclosed herein. In some examples, aspects of the operations of 820 may be performed by a resource grant component 635 as described with reference to FIG. 6.

The following provides an overview of aspects of the present disclosure:

Aspect 1: A method for wireless communication at a UE, comprising: communicating with a network entity on a first BWP using a first subscription of the UE; communicating with the network entity using a second subscription of the UE during a tune away gap associated with tuning from the first subscription to the second subscription; transmitting, to the network entity using the first subscription, an SR on each of multiple BWPs configured for the UE after the tune away gap; and receiving, from the network entity, a resource grant on a second BWP based at least in part on transmitting the SR on each of the multiple BWPs configured for the UE.

Aspect 2: The method of aspect 1, wherein transmitting the SR on each of the multiple BWPs configured for the UE comprises: transmitting a first set of one or more SRs on the first BWP after the tune away gap; and transmitting a second SR on the second BWP after the tune away gap based at least in part on a condition being satisfied.

Aspect 3: The method of aspect 2, further comprising: determining that the condition is satisfied based at least in part on a failure to receive one or more resource grants from the network entity on the first BWP responsive to the first set of one or more SRs for a threshold quantity of slots.

Aspect 4: The method of aspect 3, further comprising: determining the threshold quantity of slots based at least in part on a decoding history of the UE, the decoding history associated with a success rate of previous decoding attempts by the UE using the first subscription.

Aspect 5: The method of any of aspects 3 or 4, further comprising: determining the threshold quantity of slots based at least in part on a scheduling rate of the UE, the scheduling rate associated with a percentage of previous slots during which the UE is scheduled for communication with the network entity using the first subscription.

Aspect 6: The method of any of aspects 2 through 5, further comprising: starting a timer for restricting SR transmissions based at least in part on one of the first set of one or more SRs; and transmitting the second SR on the second BWP during an earliest available SR occasion of the second BWP that is before an expiration of the timer, wherein the condition is satisfied before the expiration of the timer.

Aspect 7: The method of any of aspects 1 through 6, further comprising: monitoring for the resource grant from the network entity on each of the multiple BWPs on which the UE transmits the SR, wherein receiving the resource grant on the second BWP is based at least in part on monitoring for the resource grant on each of the multiple BWPs.

Aspect 8: The method of any of aspects 1 through 7, further comprising: receiving, from the network entity, one or more control messages that indicate a set of BWPs that are available to the UE for communication with the network entity and that indicate a set of control resources for each BWP of the set of BWPs, the set of BWPs including at least the first BWP and the second BWP, wherein transmitting the SR on each of the multiple BWPs is based at least in part on receiving the one or more control messages that indicate the set of BWPs that are available to the UE and the set of control resources for each BWP of the set of BWPs.

Aspect 9: The method of aspect 8, wherein for each BWP of the set of BWPs that are available to the UE, the UE transmits the SR on a respective BWP using a respective set of control resources and monitors for the resource grant from the network entity on that BWP sequentially.

Aspect 10: The method of any of aspects 1 through 9, further comprising: releasing a set of radio frequency resources associated with the first subscription for a duration of the tune away gap from the first subscription, wherein transmitting the SR on each of the multiple BWPs is based at least in part on releasing the set of radio frequency resources associated with the first subscription for the duration of the tune away gap.

Aspect 11: The method of any of aspects 1 through 10, further comprising: transmitting, to the network entity on the second BWP using the first subscription, an uplink message based at least in part on receiving the resource grant on the second BWP.

Aspect 12: An apparatus for wireless communication at a UE, comprising a processor; memory coupled with the processor; and instructions stored in the memory and executable by the processor to cause the apparatus to perform a method of any of aspects 1 through 11.

Aspect 13: An apparatus for wireless communication at a UE, comprising at least one means for performing a method of any of aspects 1 through 11.

Aspect 14: A non-transitory computer-readable medium storing code for wireless communication at a UE, the code comprising instructions executable by a processor to perform a method of any of aspects 1 through 11.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   one or more processors; and
   one or more memories coupled with the one or more processors, the one or more memories storing instructions executable by the one or more processors to cause the apparatus to:
   communicate with a network entity on a first bandwidth part using a first subscription of the UE;
   communicate with the network entity using a second subscription of the UE during a tune away gap associated with tuning from the first subscription to the second subscription;
   transmit a first set of one or more scheduling requests on the first bandwidth part after the tune away gap;
   transmit a second scheduling request on a second bandwidth part after the tune away gap based at least in part on a failure to receive one or more resource grants from the network entity on the first bandwidth part responsive to the first set of one or more scheduling requests for a threshold quantity of slots, wherein the threshold quantity of slots is based at least in part on a decoding history of the UE or a scheduling rate of the UE; and
   receive, from the network entity, a resource grant on the second bandwidth part based at least in part on transmitting the second scheduling request on the second bandwidth part.

2. The apparatus of claim 1, wherein:
   the decoding history is associated with a success rate of previous decoding attempts by the UE using the first subscription.

3. The apparatus of claim 1, wherein:
   the scheduling rate is associated with a percentage of previous slots during which the UE is scheduled for communication with the network entity using the first subscription.

4. The apparatus of claim 1, wherein the instructions are further executable by the one or more processors to cause the apparatus to:

start a timer associated with restricting scheduling request transmissions based at least in part on one of the first set of one or more scheduling requests; and transmit the second scheduling request on the second bandwidth part during an earliest available scheduling request occasion of the second bandwidth part that is before an expiration of the timer, wherein the threshold quantity of slots is satisfied before the expiration of the timer.

5. The apparatus of claim 1, wherein the instructions are further executable by the one or more processors to cause the apparatus to:

monitor for the resource grant from the network entity on each of multiple bandwidth parts on which the UE transmits a scheduling request, wherein receiving the resource grant on the second bandwidth part is based at least in part on monitoring for the resource grant on each of the multiple bandwidth parts.

6. The apparatus of claim 1, wherein the instructions are further executable by the one or more processors to cause the apparatus to:

receive, from the network entity, one or more control messages that indicate a set of bandwidth parts that are available to the UE for communication with the network entity and that indicate a set of control resources for each bandwidth part of the set of bandwidth parts, the set of bandwidth parts including at least the first bandwidth part and the second bandwidth part, wherein transmitting the first set of one or more scheduling requests on the first bandwidth part and the second scheduling request on the second bandwidth part is based at least in part on receiving the one or more control messages that indicate the set of bandwidth parts that are available to the UE and the set of control resources for each bandwidth part of the set of bandwidth parts.

7. The apparatus of claim 6, wherein, for each bandwidth part of the set of bandwidth parts that are available to the UE, the UE transmits a scheduling request on a respective bandwidth part using a respective set of control resources and monitors for the resource grant from the network entity on that bandwidth part sequentially.

8. The apparatus of claim 1, wherein the instructions are further executable by the one or more processors to cause the apparatus to:

release a set of radio frequency resources associated with the first subscription for a duration of the tune away gap from the first subscription, wherein transmitting the first set of one or more scheduling requests on the first bandwidth part and the second scheduling request on the second bandwidth part is based at least in part on releasing the set of radio frequency resources associated with the first subscription for the duration of the tune away gap.

9. The apparatus of claim 1, wherein the instructions are further executable by the one or more processors to cause the apparatus to:

transmit, to the network entity on the second bandwidth part using the first subscription, an uplink message based at least in part on receiving the resource grant on the second bandwidth part.

10. A method for wireless communication at a user equipment (UE), comprising:

communicating with a network entity on a first bandwidth part using a first subscription of the UE;

communicating with the network entity using a second subscription of the UE during a tune away gap associated with tuning from the first subscription to the second subscription;

transmitting a first set of one or more scheduling requests on the first bandwidth part after the tune away gap;

transmitting a second scheduling request on a second bandwidth part after the tune away gap based at least in part on a failure to receive one or more resource grants from the network entity on the first bandwidth part responsive to the first set of one or more scheduling requests for a threshold quantity of slots, wherein the threshold quantity of slots is based at least in part on a decoding history of the UE or a scheduling rate of the UE; and receiving, from the network entity, a resource grant on the second bandwidth part based at least in part on transmitting the second scheduling request on the second bandwidth part.

11. The method of claim 10, wherein:

the decoding history is associated with a success rate of previous decoding attempts by the UE using the first subscription.

12. The method of claim 10, wherein:

the scheduling rate is associated with a percentage of previous slots during which the UE is scheduled for communication with the network entity using the first subscription.

13. The method of claim 10, further comprising:

starting a timer associated with restricting scheduling request transmissions based at least in part on one of the first set of one or more scheduling requests; and transmitting the second scheduling request on the second bandwidth part during an earliest available scheduling request occasion of the second bandwidth part that is before an expiration of the timer, wherein the threshold quantity of slots is satisfied before the expiration of the timer.

14. The method of claim 10, further comprising:

monitoring for the resource grant from the network entity on each of multiple bandwidth parts on which the UE transmits a scheduling request, wherein receiving the resource grant on the second bandwidth part is based at least in part on monitoring for the resource grant on each of the multiple bandwidth parts.

15. The method of claim 10, further comprising:

receiving, from the network entity, one or more control messages that indicate a set of bandwidth parts that are available to the UE for communication with the network entity and that indicate a set of control resources for each bandwidth part of the set of bandwidth parts, the set of bandwidth parts including at least the first bandwidth part and the second bandwidth part, wherein transmitting the first set of one or more scheduling requests on the first bandwidth part and the second scheduling request on the second bandwidth part is based at least in part on receiving the one or more control messages that indicate the set of bandwidth parts that are available to the UE and the set of control resources for each bandwidth part of the set of bandwidth parts.

16. The method of claim 15, wherein, for each bandwidth part of the set of bandwidth parts that are available to the UE, the UE transmits a scheduling request on a respective bandwidth part using a respective set of control resources and monitors for the resource grant from the network entity on that bandwidth part sequentially.

17. The method of claim 10, further comprising:
releasing a set of radio frequency resources associated with the first subscription for a duration of the tune away gap from the first subscription, wherein transmitting the first set of one or more scheduling requests on the first bandwidth part and the second scheduling request on the second bandwidth part is based at least in part on releasing the set of radio frequency resources associated with the first subscription for the duration of the tune away gap.

18. The method of claim 10, further comprising:
transmitting, to the network entity on the second bandwidth part using the first subscription, an uplink message based at least in part on receiving the resource grant on the second bandwidth part.

19. An apparatus for wireless communication at a user equipment (UE), comprising:
one or more processors; and
one or more memories coupled with the one or more processors, the one or more memories storing instructions executable by the one or more processors to cause the apparatus to:
communicate with a network entity on a first bandwidth part using a first subscription of the UE;
communicate with the network entity using a second subscription of the UE during a tune away gap associated with tuning from the first subscription to the second subscription;
transmit a first set of one or more scheduling requests on the first bandwidth part after the tune away gap;
transmit, before an expiration of a timer associated with restricting scheduling request transmissions, a second scheduling request during an earliest available scheduling request occasion of a second bandwidth part after the tune away gap based at least in part on a condition being satisfied, wherein the condition is satisfied before the expiration of the timer; and
receive, from the network entity, a resource grant on the second bandwidth part based at least in part on transmitting the second scheduling request on the second bandwidth part.

20. The apparatus of claim 19, wherein:
the condition is satisfied based at least in part on a failure to receive one or more resource grants from the network entity on the first bandwidth part responsive to the first set of one or more scheduling requests for a threshold quantity of slots.

21. The apparatus of claim 20, wherein:
the threshold quantity of slots is based at least in part on a decoding history of the UE, the decoding history associated with a success rate of previous decoding attempts by the UE using the first subscription.

22. The apparatus of claim 20, wherein:
the threshold quantity of slots is based at least in part on a scheduling rate of the UE, the scheduling rate associated with a percentage of previous slots during which the UE is scheduled for communication with the network entity using the first subscription.

23. The apparatus of claim 19, wherein the instructions are further executable by the one or more processors to cause the apparatus to:
start the timer associated with restricting the scheduling request transmissions based at least in part on one of the first set of one or more scheduling requests.

24. A method for wireless communication at a user equipment (UE), comprising:
communicating with a network entity on a first bandwidth part using a first subscription of the UE;
communicating with the network entity using a second subscription of the UE during a tune away gap associated with tuning from the first subscription to the second subscription;
transmitting a first set of one or more scheduling requests on the first bandwidth part after the tune away gap;
transmitting, before an expiration of a timer associated with restricting scheduling request transmissions, a second scheduling request during an earliest available scheduling request occasion of a second bandwidth part after the tune away gap based at least in part on a condition being satisfied, wherein the condition is satisfied before the expiration of the timer; and
receiving, from the network entity, a resource grant on the second bandwidth part based at least in part on transmitting the second scheduling request on the second bandwidth part.

25. The method of claim 24, wherein:
the condition is satisfied based at least in part on a failure to receive one or more resource grants from the network entity on the first bandwidth part responsive to the first set of one or more scheduling requests for a threshold quantity of slots.

26. The method of claim 25, wherein:
the threshold quantity of slots is based at least in part on a decoding history of the UE, the decoding history associated with a success rate of previous decoding attempts by the UE using the first subscription.

27. The method of claim 25, wherein:
the threshold quantity of slots is based at least in part on a scheduling rate of the UE, the scheduling rate associated with a percentage of previous slots during which the UE is scheduled for communication with the network entity using the first subscription.

28. The method of claim 24, further comprising:
starting the timer associated with restricting the scheduling request transmissions based at least in part on one of the first set of one or more scheduling requests.

* * * * *